US006907745B2

(12) United States Patent
Turner et al.

(10) Patent No.: US 6,907,745 B2
(45) Date of Patent: Jun. 21, 2005

(54) HEAT PUMP WITH IMPROVED PERFORMANCE IN HEATING MODE

(75) Inventors: Lynn A. Turner, Avon, IN (US); Rajendra K. Shah, Indianapolis, IN (US); Eugene L. Mills, Jr., Avon, IN (US)

(73) Assignee: Carrier Corporation, Farmington, CT (US)

( * ) Notice: Subject to any disclaimer, the term of this patent is extended or adjusted under 35 U.S.C. 154(b) by 53 days.

(21) Appl. No.: 10/606,484

(22) Filed: Jun. 26, 2003

(65) Prior Publication Data

US 2004/0261441 A1 Dec. 30, 2004

(51) Int. Cl.$^7$ .............................................. F25B 13/00
(52) U.S. Cl. .............................. 62/160; 62/181; 62/186
(58) Field of Search .......................... 62/160, 177, 178, 62/179, 180, 181, 183, 184, 186, 211, 223

(56) References Cited

U.S. PATENT DOCUMENTS

| 4,364,237 A | * | 12/1982 | Cooper et al. ................. 62/160 |
| 5,081,846 A | * | 1/1992 | Dudley et al. ................. 62/115 |
| 5,303,561 A | * | 4/1994 | Bahel et al. ................... 62/186 |
| 5,623,834 A | | 4/1997 | Bahel et al. |
| 5,628,201 A | * | 5/1997 | Bahel et al. ................... 62/211 |
| 6,131,402 A | | 10/2000 | Mills, Jr. et al. |

FOREIGN PATENT DOCUMENTS

| EP | 0 509 952 A2 | 10/1992 |
| EP | 0 962 715 A2 | 8/1999 |
| EP | 0 962 715 A3 | 8/2002 |

* cited by examiner

Primary Examiner—Harry B. Tanner
(74) Attorney, Agent, or Firm—Wall Marjama & Bilinski LLP

(57) ABSTRACT

A heat pump having an indoor coil that operates as a condenser when the system is in a heating mode and an outdoor coil that operates as an evaporator when the system is in the heating mode. A variable speed indoor fan is used to move supply air over the indoor coil and a temperature sensor is arranged to provide ambient outdoor temperature data to a programmable computer. The computer contains a schedule for continuously adjusting the speed of the indoor fan in response to changes in the ambient temperature so as to maintain the temperature of the supply air at a constant level. In doing so, the compressor discharge pressure is also maintained within allowable limits and is held substantially constant.

20 Claims, 4 Drawing Sheets

HEAT PUMP WITH IMPROVED PERFORMANCE IN HEATING MODE

BACKGROUND OF THE INVENTION

This invention relates to a heat pump having enhanced performance characteristics when operating in the heating mode.

As disclosed in U.S. Pat. No. 6,131,402 to Mills et al., many heat pumps when operating in a heating mode tend to experience a phenomenon that is generally referred to as cold blow. During a cold blow period the supply air temperature exiting the indoor coil falls below a determinable set point and a person situated in the indoor comfort zone has an uncomfortable sensation that cold air is being discharged from the heat pump. This occurs primarily because most heat pumps are optimized for operating in the cooling mode rather than the heating mode. The fan servicing the indoor coil is typically set at one speed that is optimized for the cooling mode of operations. This set fan speed, however, is relatively high and creates an indoor airflow that is greater than that required for optimum heat transfer particularly when the outdoor temperature falls below 50° F.

As explained in further detail in the above noted patent, Mills et al. the outdoor or ambient temperature is monitored and the speed of the indoor fan is reduced periodically as the outdoor temperature falls so as to maintain the indoor supply temperature at a level desired. Three different indoor airflow rates are employed with each flow rate covering a discrete outdoor temperature range. However, as the outdoor temperature decreases within each range temperature the indoor temperature will correspondently decrease.

Although, the heat pump system described in the Mills et al. patent provides greater comfort to the occupants of the comfort zone when operating in the heating mode, the changes in the supply airflow forces the system compressor to operate in varying pressure ranges which can lead to a reduction in compressor stability and reliability. The heat pump system disclosed in the Mills et al. patent also requires relatively steep and abrupt changes in the indoor fan speed. This can also lead to a reduction in fan stability and produce disturbing fan noise levels.

When a heat pump cycle is reversed from a cooling mode of operation to a heating mode, the low pressure refrigerant vapor line becomes a high pressure discharge vapor line and there is a danger that the pressure in the line can exceed the maximum allowable line pressure for the particular heat pump unit. Some heat pumps, and in particular those employing a R-410a refrigerant, are equipped with vapor pressure switches which are arranged to inactivate the outdoor coil fan when the vapor pressure approaches the allowable minimum level. This cycling of the outdoor coil fan can adversely effect the supply air temperature as well as the system capacity and efficiency.

SUMMARY OF THE INVENTION

It is a primary object of the present invention to improve heat pumps.

It is a further object of the present invention to improve the operation of a heat pump when functioning in a heating mode.

It is a still further object of the present invention is to eliminate the cold blow phenomenon when a heat pump is operating in the heating mode.

Another object of the present invention is to insure that the vapor pressure within the refrigerant lines of a heat pump does not exceed allowable limits.

A still further object of the present invention is to eliminate the need of a vapor pressure switch in a heat pump unit.

Yet another object of the present invention is to improve compressor reliability in a heat pump unit.

Still another object of the present invention is to reduce the indoor fan noise level of a fancoil or furnace particularly when the heat pump is operating in the heating mode.

These and other objects of the present invention are attained by means of a heat pump unit having an indoor coil that operates as a condenser when the unit is in a heating mode. The ambient outdoor temperature is monitored and outdoor temperature data is sent to the unit's programmable processor containing a schedule which is arranged to continuously adjust the speed of the indoor fan in response to changes in the outdoor temperature so as to maintain the supply air temperature at a constant level over the operating range of the unit.

BRIEF DESCRIPTION OF THE DRAWINGS

For a better understanding of these and other objects of the present invention, reference will be made to the following detailed description of the invention which is to be read in association with the accompanying drawings, wherein.

DETAILED DESCRIPTION OF THE INVENTION

Figure 1:
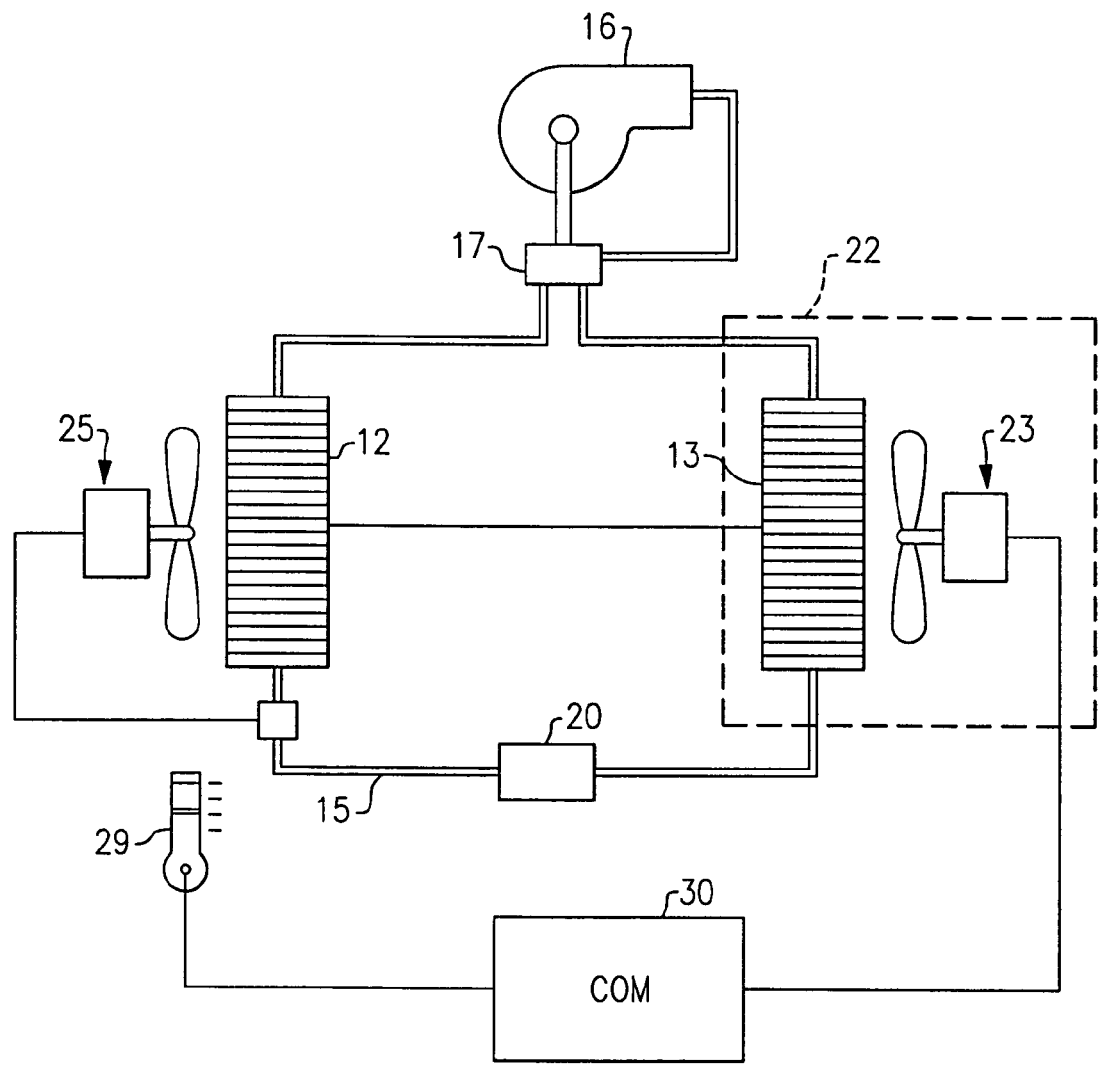
FIG. 1 is a schematic representation of a heat pump embodying the teachings of the present invention.

Referring to FIG. 1, there is illustrated a schematic representation of a heat pump unit, generally referenced 10, that embodies the teachings of the present invention. The unit includes an outdoor heat exchanger or coil 12, one side of which is connected to an indoor coil 13 by a refrigerant line 15. The opposite sides of the two coils are connected to a compressor 16 through means of a four way flow reversing valve 17 so that the flow of refrigerant can be moved by the compressor in either direction. An expansion valve 20 that is capable of throttling refrigerant that is moving in either direction is mounted in the refrigerant line 15. When operating in the heating mode, the indoor coil serves as a condenser to heat supply air that is circulated through a comfort zone 22 by an indoor variable speed fan unit 23. The outdoor coil at this time functions as the system's evaporator to absorb energy from the outdoor air as the air is moved over the coil by the outdoor fan unit 25. The roles of the two coils are reversed when the system is operating in the cooling mode.

Although the present system can operate in associate with any conventional heat pump, it will be explained herein with specific detail to a heat pump manufactured by Carrier Corp.

under the machine designation 38YXA060 which is designed to utilize R-410a as a refrigerant rather than the older R-22 refrigerant. Although the newer refrigerant has many advantages when compared to the older refrigerants, R-410a can develop high vapor pressures in the refrigerant line when the heat pump is operating in the heating mode. As noted above, to avoid problems, many heat pumps employing the R-410a refrigerant are equipped with a vapor pressure switch which serves to cut off the outdoor fan before the line pressure can reach a maximum allowable design pressure. Cycling of the vapor pressure switch, however, can have an adverse effect on the supply air temperature as well as the system's capacity and efficiency. As will be explained below, the present system eliminates the need for a vapor pressure switch by continually maintaining the discharge pressure of the compressor at a level such that the maximum allowable pressure is not exceeded.

The present system is equipped with a temperature sensor 29 that is situated adjacent to the outdoor coil 12. The sensor can be a thermistor or any other type of device that is arranged to sense the outdoor ambient air temperature and provide outdoor temperature data to the system's controller 30. The controller includes a programmable computer that contains a preprogrammed schedule for continuously changing the speed of the indoor fan unit 23 in response to changes in the outdoor temperature such that the supply air temperature leaving the indoor coil remains constant as the outdoor temperature changes. The schedule may be a linear function such as:

$$A = B[3.5\ C + 137] \quad (1)$$

Where:
A is the indoor supply airflow in CFM
B is the size of the system rated in horsepower; and
C is the outdoor air temperature in ° F.

Although a linear function may be used to determine the desired airflow needed to maintain a constant supply air temperature, exponential functions and tables may also be used to determine the required change in indoor airflow in response for a given system.

Figure 2:
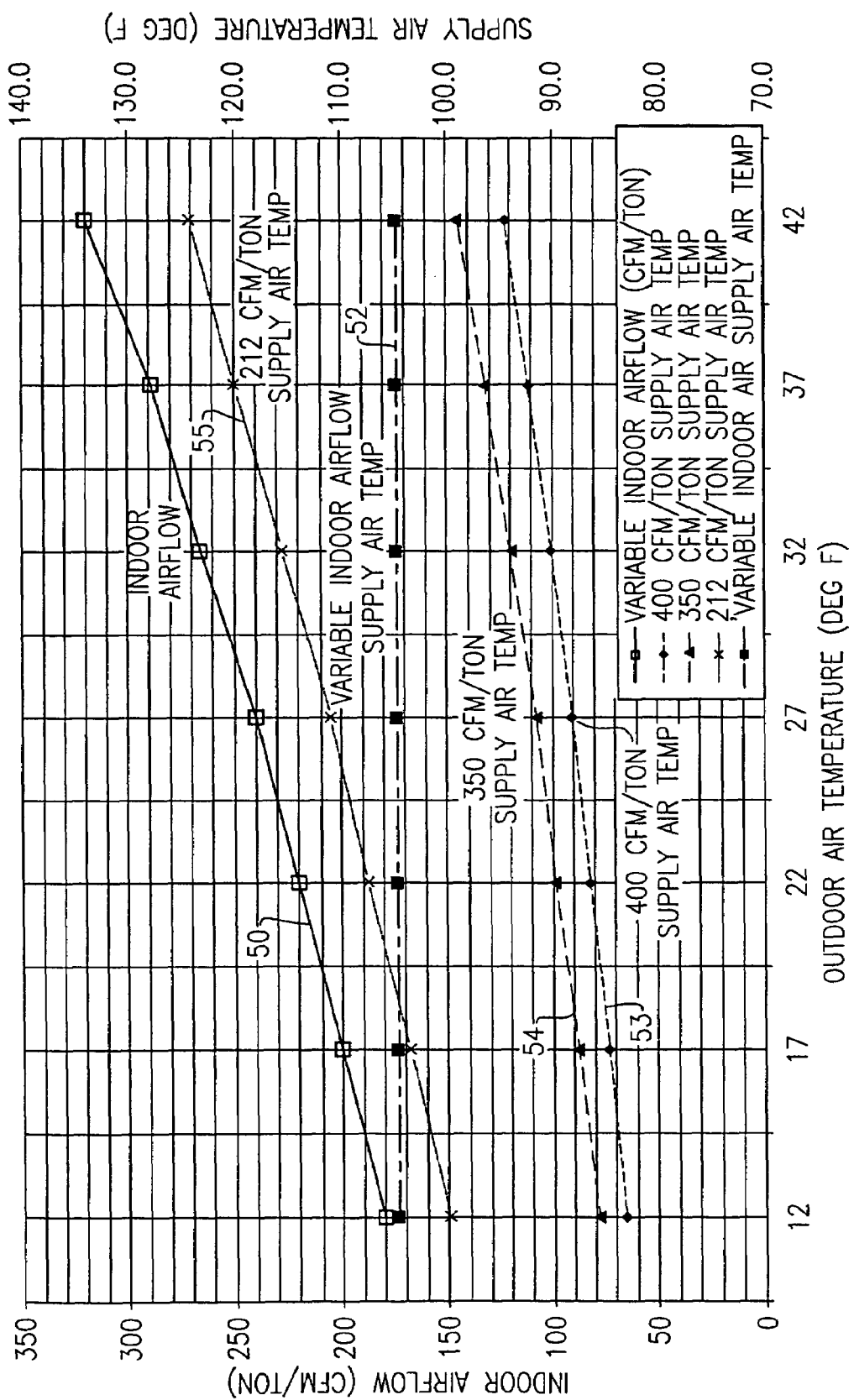
FIG. 2 is a graphic illustration of a heat pump operating curves wherein indoor supply airflow and supply air temperature are plotted against the outdoor air temperature.

FIG. 2 is a graphic representation in which indoor supply airflow and supply air temperature are plotted against outdoor air temperature. The curves shown in the graph have been generated from data pertaining to a Carrier Corp. 38YXA060 heat pump operating with the return air temperature at about 70° F. Curve 50 illustrates the supply airflow that is required in order to maintain the supply air temperature at a constant 105° F. as the outdoor temperature varies between 12° F. and 42° F. The supply air temperature is represented by the linear curve 52. Curves 53–55 illustrate how the supply air temperature will vary for various steady indoor airflows as the outdoor temperature varies between 12° F. and 42° F.

For most heat pumps cold blow generally occurs at a supply air temperature of about 98° F. Curve 53 shows the change in supply air temperature when the indoor fan is moving supply at a relatively high rate of about 400CFM/ton. As can be seen at this high rate of flow, the supply air temperature remains well below the desired 98° F. temperature at which cold blow occurs and, although the comfort area is being heated, occupants of the area will experience a certain amount of discomfort. Curve 54 depicts the change in supply air temperature when the indoor airflow is reduced slightly to about 350CFM/ton. By slowing down the airflow, more energy can be transferred to the supply air, yet the supply air temperature remains close to or below the desired minimum 98° F. level. Curve 55 depicts the change in supply air temperature when the indoor airflow is further reduced to 212CFM/ton. At this relatively low airflow the supply air temperature can be maintained above the 98° F. level over the outdoor temperature range of 12° F. and 42° F., however, as will be explained below, operating at these low flow rates give rise to other problems.

Figure 3:
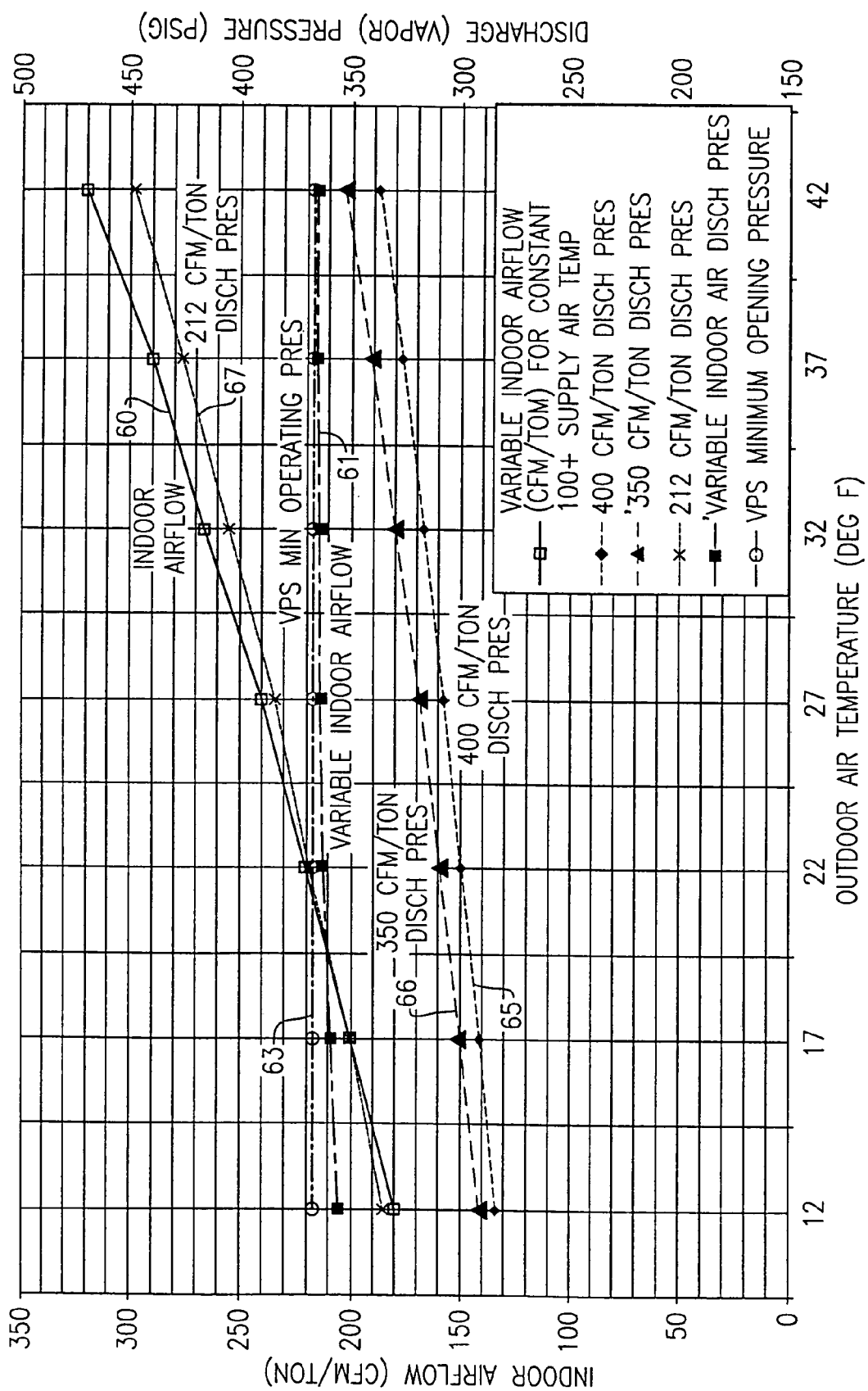
FIG. 3 is a graphic illustration of heat pump a operating curves wherein indoor supply airflow and compressor discharge vapor pressure is plotted against the outdoor temperature.

Turning now to FIG. 3 there is shown a graphic representation wherein indoor airflow and discharge vapor pressure are plotted against the outdoor air temperature within the range of 12° F. and 42° F. Curve 60 depicts a variable indoor airflow for maintaining a constant supply air temperature of a little over 100° F. at which cold blow will not occur. At this constant supply air temperature the compressor discharge pressure of the heat pump system will also remain relatively constant as is depicted by the linear curve 61. By design, the discharge pressure at this constant supply air temperature is set so that the maximum allowable vapor pressure in the refrigerant lines is not exceeded. This maximum pressure is depicted by the linear curve 63 which runs generally parallel to the variable indoor airflow discharge pressure curve 61. As can be seen, by continuously adjusting the indoor airflow to maintain the indoor supply air temperature at a constant temperature level which is well above the cold blow temperature will at the same time serve to maintain the compressor discharge pressure at a level below that at which line pressures in the system become dangerously high. Accordingly, the need for a vapor pressure switch is unnecessary in the present system.

With further reference to FIG. 3, curves 65–67 depict the changes in discharge pressure for the previously noted constant indoor flow rates of 400, 350, and 212CFM/ton, respectively. As clearly illustrated, at the low flow rate of 212CFM/ton the line pressure in the system will exceed the allowable limit when the outdoor temperature rises above 20° F. Accordingly, employing the relatively low constant airflow simply to gain higher supply air temperatures will severely limit the operating range of the heat pump. When operating at the two higher indoor flow rates, the discharge pressure can be maintained well below the allowable system limit, however, as pointed out above with reference to FIG. 2 at these high flow rates the supply air temperature will generally not exceed 98° F. and will result in discomfort problems.

Figure 4:
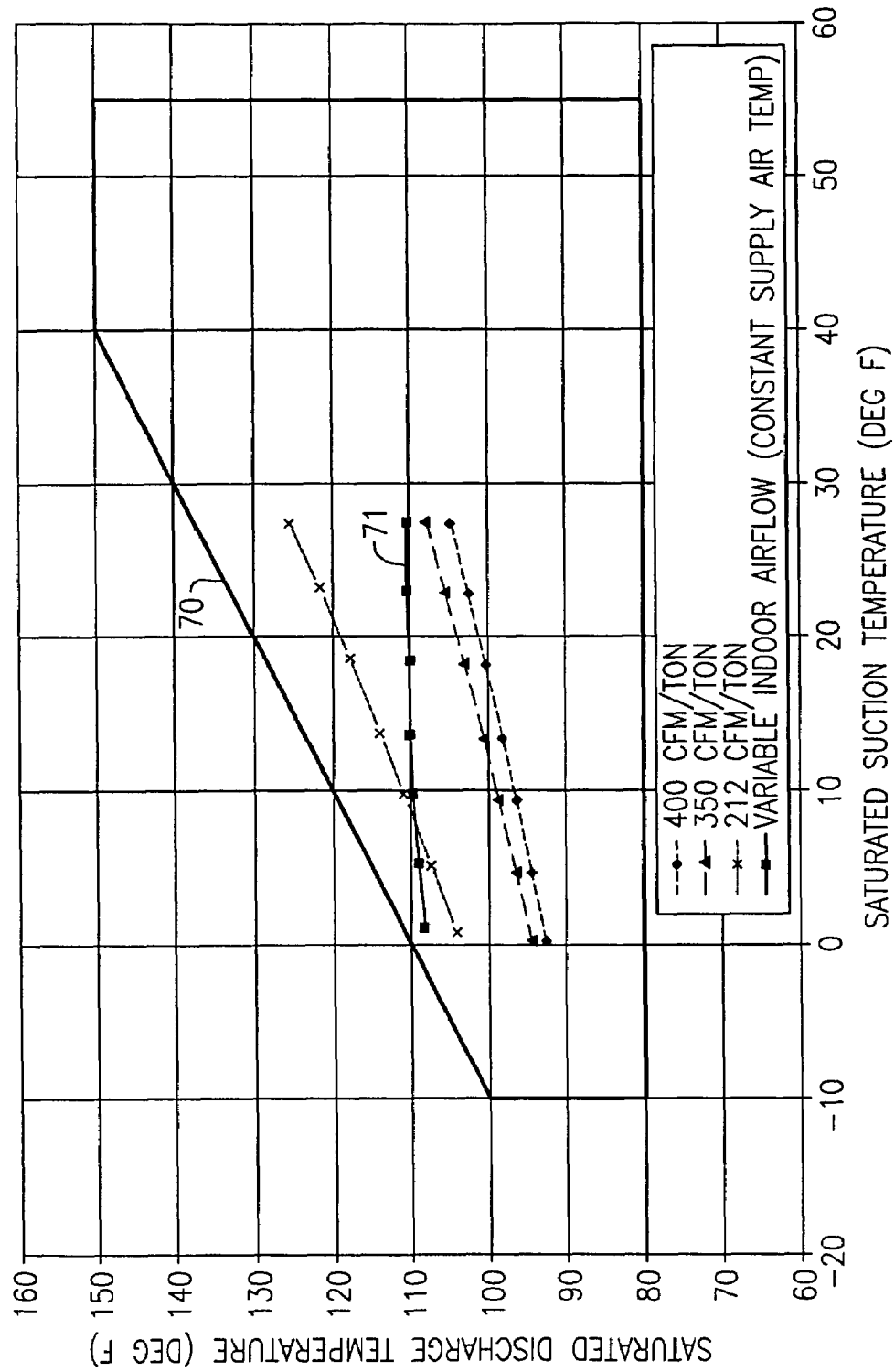
FIG. 4 is a graphic illustration of an operating envelope for a compressor suitable for use in a heat pump wherein the saturated discharge temperature of a refrigerant moving through the compressor is plotted against the saturated suction temperature.

Turning now to FIG. 4, there is illustrated the compressor operating curve for the present heat pump system wherein saturated discharge temperature is plotted against saturated suction temperature for R410a refrigerant. The compressor envelope is illustrated at 70 which delineates the limits of the suction and discharge temperature in order to maintain safe system operations. The operating curve 71 for a variable indoor airflow clearly shows that the discharge temperature and thus the discharge pressure of the compressor remains relatively stable within the operating range of the unit leading to improved compressor reliability when compared to the operating curves 81–83 relating to systems that operate at the noted constant indoor airflow.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A heat pump system having an indoor coil that operates as a condenser when the system is in a heating mode and an outdoor coil that operates as an evaporator when the system is in said heating mode, wherein said system includes:
- adjustable airflow means for moving supply air over the indoor coil;
- a sensor means for measuring outdoor ambient temperatures and sending ambient temperature data to a programmable computer for adjusting said airflow means;
- program means in said computer containing a schedule for continuously adjusting the airflow means in response to changes in ambient temperatures to maintain the temperature of the supply air moving over the indoor coil at a constant level.

2. The system of claim 1 wherein said adjustable airflow means includes a variable speed fan.

3. The system of claim 1 wherein said supply air temperature is maintained at a level that is high enough to avoid a cold blow condition in the supply airflow.

4. The system of claim 3 wherein the discharge pressure of the compressor is maintained at a level such that the vapor line pressure remains below an allowable design pressure.

5. The system of claim 3 wherein said supply air temperature is maintained at a constant level above 98° F. and a vapor line pressure below 370PSIG.

6. The system of claim 1 wherein the temperature of the supply air is maintained as high as possible while controlling the vapor line pressure and compressor pressure ratio within allowed limits.

7. The system of claim 3 wherein said vapor line pressure limit is within established standard refrigeration vapor line piping pressure limits.

8. The system of claim 7 wherein said compressor pressure ration limit is within established limits for reliable operation of a compressor.

9. A heat pump system having an indoor coil that operates as a condenser when the system is in a heating mode and an outdoor coil that operates as an evaporator when the system is in said heating mode, wherein said system includes:
- a compressor having a discharge pressure;
- adjustable airflow means for moving supply air over the indoor coil;
- a sensor means for measuring outdoor ambient temperatures and sending ambient temperature data to a programmable computer for adjusting said airflow means;
- program means in said computer containing a schedule for continuously adjusting the airflow means in response to changes in ambient temperatures to maintain the compressor discharge pressure within reliable operating limits.

10. The system of claim 9 wherein said adjustable airflow means includes a variable speed fan.

11. The system of claim 10 wherein said operation limits are within established standard limits for refrigeration grade vapor line piping.

12. The system of claim 11 wherein the discharge pressure of the compressor is maintained at a substantially constant level.

13. A method of operating a heat pump in the heating mode, said heat pump having a compressor, an indoor coil serving as a condenser in the heating mode, and an outdoor coil acting as an evaporator in the heating, said method including the steps of:
- sensing the outdoor ambient temperature;
- continually adjusting the indoor airflow over the indoor coil in response to changes in the sensed outdoor temperature to maintain the supply air temperature at a constant level.

14. The method of claim 13 wherein the indoor airflow over the indoor coil is adjusted by regulating the speed of a coil fan motor for passing return air over the coil.

15. The method of claim 13 wherein the temperature of the supply air is maintained at a level above which a cold blow condition occurs.

16. The method of claim 13 that includes the further step of maintaining the discharge pressure of the compressor at a level below a maximum allowable vapor line pressure for the system.

17. A method of operating a heat pump in the heating mode, said heat pump having a compressor, an indoor coil serving as a condenser in the heating mode, and an outdoor coil acting as an evaporator in the heating mode, said method including the steps of:
- sensing the outdoor ambient temperature;
- continually adjusting the indoor airflow over the indoor coil in response to changes in the sensed outdoor temperature to maintain compressor discharge pressure within reliable operating limits.

18. The method of claim 17 where the indoor airflow over the indoor coil is adjusted by regulating the speed of a coil fan motor for passing return air over the coil.

19. The method of claim 18 wherein said operating limits are within established standard limits for refrigeration guide vapor line piping.

20. The method of claim 19 that includes the further step of maintaining the discharge pressure of the compressor at a substantially constant level.

* * * * *